United States Patent
Johnson

(10) Patent No.: US 9,429,145 B2
(45) Date of Patent: Aug. 30, 2016

(54) THERMAL GRADIENT HYDROELECTRIC POWER SYSTEM AND METHOD

(75) Inventor: Rowland Xavier Johnson, Houston, TX (US)

(73) Assignees: Rowland Xavier Johnson, Katy, TX (US); Glen Rector, The Woodlands, TX (US)

( * ) Notice: Subject to any disclaimer, the term of this patent is extended or adjusted under 35 U.S.C. 154(b) by 0 days.

(21) Appl. No.: 13/427,870

(22) Filed: Mar. 22, 2012

(65) Prior Publication Data

US 2012/0240576 A1 Sep. 27, 2012

Related U.S. Application Data

(60) Provisional application No. 61/466,329, filed on Mar. 22, 2011.

(51) Int. Cl.
*F03G 7/04* (2006.01)

(52) U.S. Cl.
CPC ........................................ *F03G 7/04* (2013.01)

(58) Field of Classification Search
CPC ... F03G 7/04; F03G 7/05; Y02E 10/20–10/28; Y02E 10/34
USPC .............................. 60/639, 641.6–641.7, 675
See application file for complete search history.

(56) References Cited

U.S. PATENT DOCUMENTS

| | | | | |
|---|---|---|---|---|
| 3,953,971 A | * | 5/1976 | Parker | 60/641.6 |
| 4,087,975 A | | 5/1978 | Owens | |
| 4,216,657 A | * | 8/1980 | Ridgway | F03G 7/05 60/641.7 |
| 4,244,189 A | * | 1/1981 | Bliamptis | 60/641.11 |
| 4,255,933 A | * | 3/1981 | Bailey et al. | 60/641.2 |
| 4,382,365 A | * | 5/1983 | Kira et al. | 60/675 |
| 4,450,689 A | * | 5/1984 | Moe | F03G 7/05 60/641.7 |
| 5,009,069 A | * | 4/1991 | Molini | 60/641.1 |
| 5,513,494 A | * | 5/1996 | Flynn et al. | 60/641.7 |
| 5,582,691 A | | 12/1996 | Flynn et al. | |
| 6,434,942 B1 | * | 8/2002 | Charlton | 60/641.11 |
| 6,651,434 B2 | * | 11/2003 | Sanchez Gomez | 60/641.11 |
| 8,042,338 B2 | | 10/2011 | Russo | |
| 2002/0023439 A1 | * | 2/2002 | Sanchez Gomez | 60/641.8 |
| 2008/0314043 A1 | * | 12/2008 | Howard | F01K 25/106 60/641.7 |
| 2009/0013691 A1 | * | 1/2009 | Jones | F03G 7/05 60/641.7 |
| 2009/0217664 A1 | * | 9/2009 | Rapp et al. | 60/641.6 |
| 2009/0288410 A1 | * | 11/2009 | Wolter | 60/517 |
| 2011/0011572 A1 | * | 1/2011 | Nagurny | F28D 7/024 165/172 |
| 2012/0031096 A1 | * | 2/2012 | Ulas Acikgoz et al. | 60/651 |
| 2012/0073290 A1 | * | 3/2012 | Lau | 60/641.7 |

FOREIGN PATENT DOCUMENTS

JP 10009774 A * 1/1998
WO WO 2009082372 A1 * 7/2009

* cited by examiner

*Primary Examiner* — Thomas Denion
*Assistant Examiner* — Mickey France
(74) *Attorney, Agent, or Firm* — Ramey & Schwaller, LLP

(57) ABSTRACT

A thermal gradient hydroelectric power system and method is disclosed herein. Specifically, the method can comprise cycling through a submersed evaporator warm from a natural warm water source, said warm water source having a first temperature. The method also can comprise evaporating a working fluid using said evaporator, and routing the working fluid from the evaporator through a vapor line to a condenser above said evaporator. Finally, the method can also comprise cycling through a condenser cold water from a natural cold water source, the cold water source having a second temperature, and condensing the working fluid, the working fluid having a boiling point between said first temperature and said second temperature.

1 Claim, 2 Drawing Sheets

THERMAL GRADIENT HYDROELECTRIC POWER SYSTEM AND METHOD

CROSS REFERENCE TO RELATED APPLICATIONS

This application claims the benefit of provisional patent application Ser. No. 61/466,329, filed Mar. 22, 2011 by the present inventor.

BACKGROUND

The impact of environmental and climate change, coupled with high oil prices, fossil fuel resources and energy regulations are driving the development of renewable energy. The present invention is based on thermal gradient energy conversion for the generation of hydroelectric power.

As the oceans cover a little more than 70 percent of the Earth's surface it makes the sea the largest solar energy collector on the planet and is ideally suited for the present invention. When the difference between the warm surface water and the cold deep water is above 18 degrees Celsius, a thermal energy conversion system becomes viable as it utilizes this natural thermal gradient to drive a power plant. Typically around 3,000 mega watts of electrical power can be produced per 100 square miles of ocean surface.

Conventional ocean thermal energy conversion designs use a fluid, such as ammonia, (Closed cycle) or sea water (Open cycle) to rotate a turbine to generate electricity. The disadvantage of conventional designs is that a low pressure vapor turbine requires a much higher ocean temperature gradient to operate. Low pressure vapor turbines are inherently big, expensive and inefficient compared to high pressure hydraulic turbines of similar output. The system also requires a large floating platform to support the heat exchangers, pumps and turbine and the platform should also be designed to withstand severe storms and hurricanes.

As such it would be useful to have a thermal gradient hydroelectric power system and method.

SUMMARY

An object of the present disclosure is to provide an economical, reliable and environmentally friendly thermal gradient energy conversion system for generating electricity and providing the electricity to existing electrical power grids or other independent power consumers.

Specifically, the disclosure describes a power generation system, comprising a submersible evaporator, a vapor line, a condenser above the submersible evaporator, a liquid line, and a turbine system. The submersible evaporator can have a warm water inlet connectable to a natural warm water source, the warm water source having a first temperature; an evaporator shell connected to the warm water inlet; a warm water discharge connected to the evaporator shell; an evaporator working fluid inlet; one or more evaporator coils connected to the working fluid inlet; and an evaporator working fluid discharge connected to the one or more evaporator coils. The vapor line can have a vapor line first end connected to the evaporator working fluid discharge and a vapor line second end. The condenser above the submersible evaporator can comprise a cold water inlet capable of receiving cold water from a natural cold water source; the cold water having a second temperature; a condenser shell connected to the cold water inlet; a cold water discharge connected to the condenser shell; a condenser working fluid inlet connected to the vapor line second end; one or more evaporator coils connected to the working fluid inlet; a condenser working fluid discharge connected to the one or more evaporator coils. The liquid line can have a liquid line first end connected to the condenser working fluid discharge, and a liquid line second end. The turbine system can have a turbine system inlet connected to the liquid line second end; a turbine rotatable by a working fluid, the working fluid having a boiling temperature between the first temperature and the second temperature; and a turbine system outlet that connects to the evaporator working fluid inlet.

Specifically, the method can comprise cycling through a submersed evaporator warm from a natural warm water source, the warm water source having a first temperature. The method also can comprise evaporating a working fluid using the evaporator, and routing the working fluid from the evaporator through a vapor line to a condenser above the evaporator. Finally, the method can also comprise cycling through a condenser cold water from a natural cold water source, the cold water source having a second temperature, and condensing the working fluid, the working fluid having a boiling point between the first temperature and the second temperature.

DETAILED DESCRIPTION

Described herein is a title system and method. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
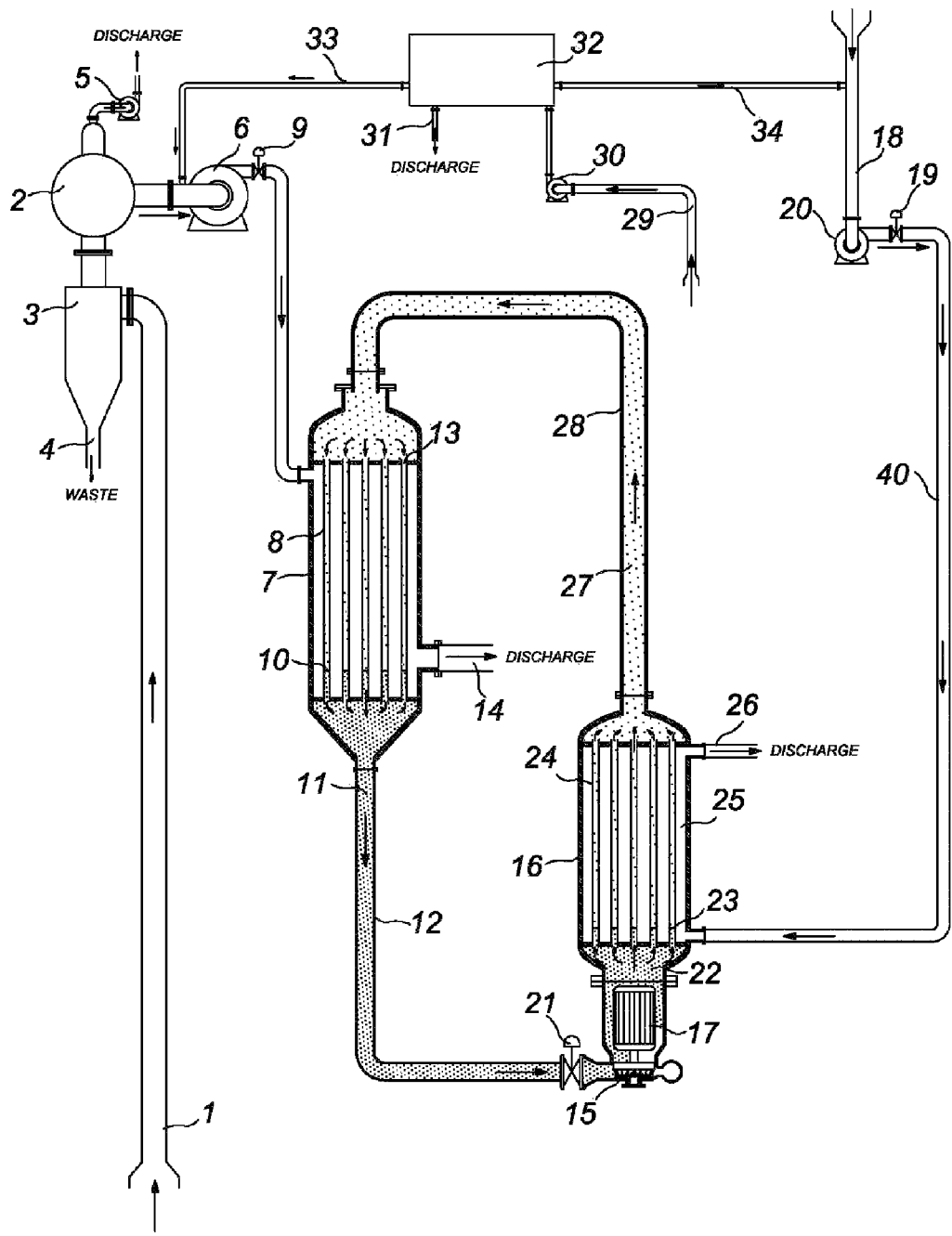
FIG. 1 illustrates a schematic flow diagram of a thermal gradient hydroelectric power system.

FIG. 1 illustrates a schematic flow diagram of a thermal gradient hydroelectric power system. One working, suitable fluid for the disclosed system and method is 1,1,1,2,3,3,3-Heptafluoropropane CF3-CHF-CF3 (R-227ea), as it has a good liquid to vapor density ratio and low latent heats of evaporation and condensation, thus giving the fluid a high energy conversion efficiency and available liquid head for the hydraulic turbine at low temperature gradients. Other refrigerant type of fluids can be used, but many give lower energy conversion efficiencies and liquid heads requiring a greater thermal gradient.

The working fluid can be in communication with one or more condenser tubes 8, a liquid line 12, a turbine 15, a generator 17, one or more vaporizer tubes 24, and a vapor line 27. In a no flow or static condition, the liquid level in pipe 12 and vaporizer tubes 24 can be equal.

A suction pipe 1 can feed relatively cold deep water to a pump 6. In one embodiment, and inline de-aerator 2 and a cyclone 3 can remove debris, small marine organisms and dissolved gasses from the water. The gasses can be extracted by vacuum pump 5 and discharged. The debris and marine organisms removed by cyclone 3 can be returned as waste back to the body of water through a cyclone dip leg 4. The cold water from pump 6 can be delivered to the shell of condensing heat exchanger 7 and can be in external fluid communication with condenser tubes 8 providing the required quantity of water needed to condense vapor 13 inside condenser tubes 8. The flow of the cold water can be, in one embodiment, regulated by a control valve 9. Spent water can be exhausted through condenser outlet 14 back to the body of water at a temperature a few degrees higher than the condenser water inlet temperature. For example, saturated Heptafluoropropane (R-227ea) vapor at 2.67 Bar absolute and 8.3 degrees Celsius will condense when cold ocean water of between 2 and 3 degrees Celsius is pumped from approximately 1000 m below the surface and passed through a condensing heat exchanger. Within these conditions, 9.77 kg of water is required to pass through the heat exchanger to condense 1 kg of R-227ea vapor. Such example is exemplary and not limiting.

The difference in height between liquid level 10 in condenser tubes 8 and liquid level 23 in vaporizer tubes 24 depends on the physical properties of the working fluid, and the available thermal gradient. The optimum height (pressure head) of the liquid can be maintained by regulating the flow of liquid to a turbine or other engine by means of a second control valve 21. For example, the optimum height for R-227ea with a 20 degrees Celsius thermal gradient is 430 meters. The height can decrease with a decrease in the thermal gradient. The height and flow of the fluid affects the turbine power output.

The condensed liquid 11 from condenser tubes 8 enters the high pressure side of turbine 15 through pipe 12 and is exhausted at a lower pressure into vaporizer tubes 24. The transfer of energy of the flowing liquid causes turbine 15 to rotate providing the power to drive a generator 17. The generator power output is regulated by the liquid flow control valve 21. For example, kg/sec, can produce 1000 kw at a combined turbine and generator efficiency of 93%

A suction pipe 18 can feed warm surface water to pump 20. Supply line 40 can deliver warm water from pump 20 to a shell side 25 of a vaporizing heat exchanger 16 and can be in external fluid communication with vaporizer tubes 24 providing the required quantity of water to boil the liquid 22 inside vaporizer tubes 24. The flow of the warm water can be regulated by control valve 19. The spent water is exhausted through vaporizer outlet 26 back to the body of water at a temperature a few degrees lower than the vaporizer water inlet temperature.

Vapor 27, generated in vaporizer tubes 24, can rise in vapor line 28 and can be delivered to condenser tubes 8. As vapor 27 rises in vapor line 28, the pressure and temperature of the vapor can decrease to slightly higher than that of condenser tubes 8 within which vapor 27 is again condensed, as previously described, thus completing a closed loop cycle of the working fluid. For example, liquid R-227ea at 3.6 Bar absolute and 17.6 deg. Centigrade will boil when warm ocean surface water of between 22 and 23 deg. Centigrade is pumped from the ocean surface and passed through a boiler and vaporizing heat exchanger. Within these conditions, 9.6 kg of water can boil and vaporize up to 1 kg of (R-227ea) liquid. As the vapor rises in the 430 meter high vapor line, the pressure drops to 2.67 Bar absolute and the temperature to 9.0 deg. Centigrade at the condensing heat exchanger inlet. The cold ocean water of between 2 and 3 deg. Centigrade passing through the condenser can once again condense the vapor. Such example is exemplary, and is not intended to be limiting.

The use of sodium hypochlorite at acceptable concentrations is effective in controlling bio-fouling on the surface of condenser tubes 8 and vaporizer tubes 24. Salt water or seawater can be drawn through line 29 by pump 30 and delivered to an electro chlorinator 32. The chlorine gas generated in the electro chlorinator 32 is delivered to the intake of pump 6 through line 33 and pump 20 through line 34. The spent brine is discharged as waste from the electro chlorinator 32 through line 31.

In one embodiment, as pumps 6 and 20 draw power from generator 17, flow regulation of cold water from pump 6 and warm water from pump 20 is critical in achieving optimum heat exchanger performance. High flow rates may not improve heat exchanger efficiencies for a given temperature, thereby consuming unnecessary surplus power produced by the generator 17.

Figure 2:
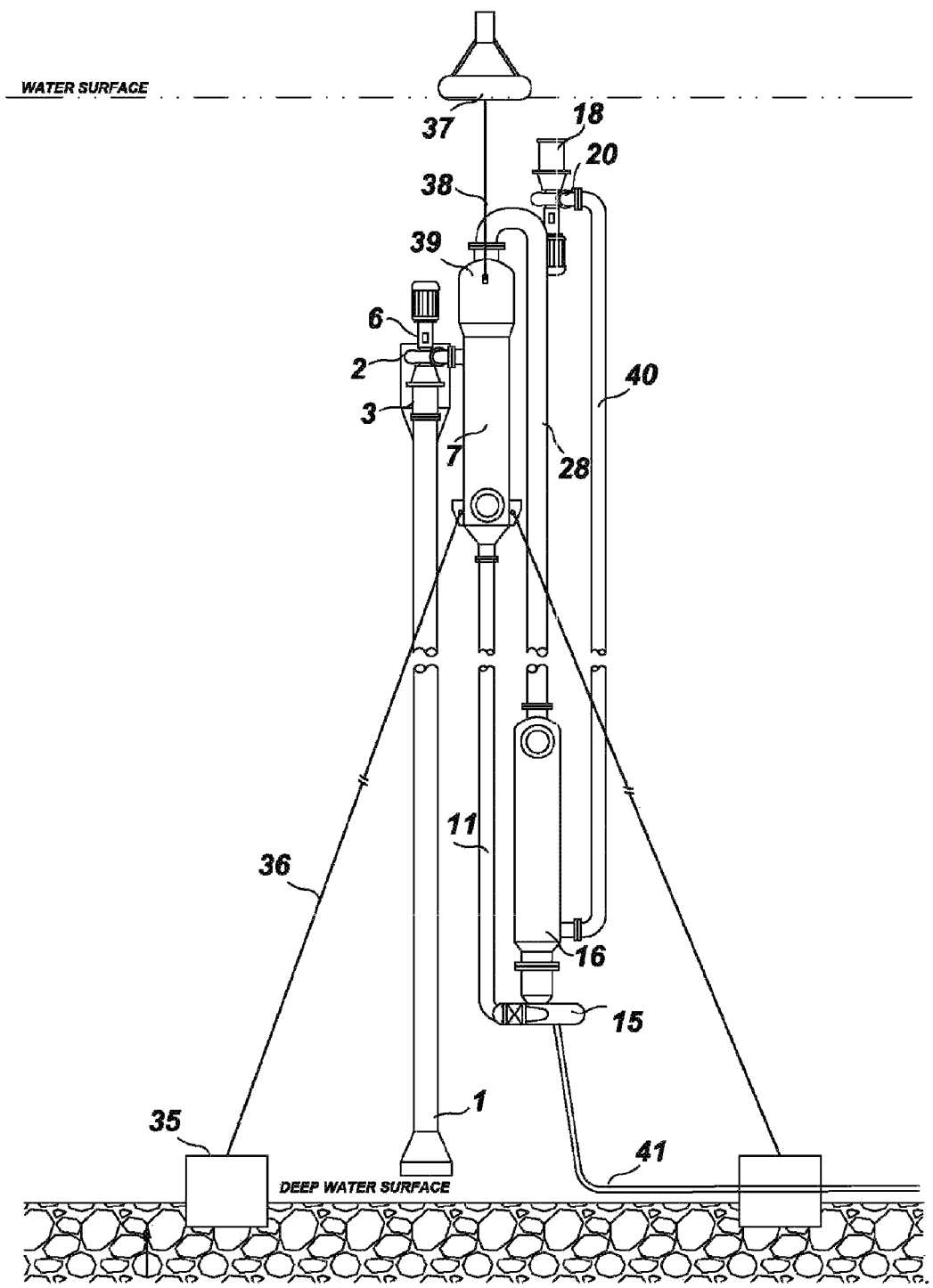
FIG. 2 illustrates a general arrangement drawing, illustrating a submerged thermal gradient hydroelectric power system.

FIG. 2 illustrates one exemplary arrangement of an equipment, pumps, piping and anchoring system. Cold water suction line 1, de-aerator 2, cyclone 3 and pump 6 are formed integrally with condensing heat exchange 7 and can be designed to be neutrally buoyant. In one embodiment, this can be accomplished using low density insulation. Liquid line 11, turbine 15 and vaporizer 16 can be formed integrally with condensing heat exchanger 7 and also can be designed to be neutrally buoyant by means of low density insulation or other methods known in the art. Vapor line 28 is formed integrally with condensing heat exchanger 7 and vaporizing heat exchanger 16 and is designed to be near neutrally buoyant by means of high density concrete. Warm water suction 18, pump 20 and warm water line 40 can also be formed integrally with vaporizing heat exchanger 16 and can be designed to be near neutrally buoyant by means of low density insulation. The low density insulation and high density concrete also serve as corrosion protection to the external wetted parts of the equipment and piping. Small equipment, pumps, instrumentation and switchgear are housed in compartment 39. The power cable from the generator is fed up through vapor line 28 and is connected to the electrical bus bar in compartment 39. The supply cable for pumps 6 and pump 20 is fed from the electrical bus bar. Surplus electrical power from the bus bar is transmitted via a subsea cable 41 to existing onshore electrical power grids or other independent power consumers.

The entire thermal gradient hydroelectric power system can be submerged and can be anchored by one or more cables 36. In one embodiment, cables can connect one or more between condenser 7 and anchor block 35. A floating warning buoy 37 can be attached to compartment 39.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A submersible marine hydroelectric power plant comprising:
  - an evaporating heat exchanger assembly at more than one hundred meters below the ocean surface to evaporate a working fluid using a warm water extracted from the ocean surface by conventional heat exchange methods comprising
    - an evaporating heat exchanger warm water inlet connected to one or more pumps;
    - said one or more pumps receiving water from a natural warm water source;
    - one or more evaporating heat exchanger coils; and
    - an evaporating heat exchanger working fluid discharge connected to said one or evaporating heat exchanger coils;
  - a hydraulic turbine rotatable by a condensed working fluid having a turbine system inlet and discharging said condensed working fluid into said one or more evaporating heat exchanger coils;
  - an electric generator rotatable by said hydraulic turbine;
  - a vapor riser having
    - a vapor riser first end connected to said evaporator evaporating heat exchanger working fluid discharge; and
    - a vapor riser second end;
  - a condensing heat exchanger assembly at or near the ocean surface to condense said working fluid, as liquid potential energy used to drive said hydroelectric turbine in a conventional manner, using the cold water extracted from the deep ocean by conventional heat exchange methods comprising
    - a condensing heat exchanger cold water inlet connected to one or more pumps;
    - said one or more pumps receiving water from a natural cold water source;
    - a condensing heat exchanger working fluid inlet connected to said vapor riser second end;
    - one or more condensing heat exchanger coils connected to said condensing heat exchanger working fluid inlet;
    - and
    - a condensing heat exchanger working fluid discharge connected to said one or more condensing heat exchanger coils;
  - a liquid line having
    - a liquid line first end connected to said condensing heat exchanger working fluid discharge; and
    - a liquid line second end connected to said turbine system inlet; and
  - wherein the submersible marine hydroelectric power plant is located at an offshore location where the ocean thermal gradient is greater than eighteen degrees Celsius and the ocean depth is greater than five hundred meters to provide hydroelectric power by utilizing a natural thermocline of an ocean.

* * * * *